United States Patent
Shi et al.

(10) Patent No.: US 10,020,015 B2
(45) Date of Patent: Jul. 10, 2018

(54) MAGNETIC MEDIUM HAVING MULTILAYERED SERVO LAYER AND METHOD OF FORMING THE SAME

(71) Applicant: MARVELL INTERNATIONAL LTD., Hamilton (BM)

(72) Inventors: Jianzhong Shi, Singapore (SG); Jiang Feng Hu, Singapore (SG); Lionel Hanxiang Ng, Singapore (SG); Chun Lian Ong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/022,433

(22) PCT Filed: Sep. 16, 2014

(86) PCT No.: PCT/SG2014/000436
§ 371 (c)(1),
(2) Date: Mar. 16, 2016

(87) PCT Pub. No.: WO2015/041600
PCT Pub. Date: Mar. 26, 2015

(65) Prior Publication Data
US 2016/0225395 A1    Aug. 4, 2016

(30) Foreign Application Priority Data
Sep. 17, 2013  (SG) .................... 201307023

(51) Int. Cl.
*G11B 5/66* (2006.01)
*G11B 5/65* (2006.01)
*G11B 5/84* (2006.01)

(52) U.S. Cl.
CPC ............. *G11B 5/66* (2013.01); *G11B 5/65* (2013.01); *G11B 5/8404* (2013.01)

(58) Field of Classification Search
None
See application file for complete search history.

(56) References Cited

U.S. PATENT DOCUMENTS

| | | | | | |
|---|---|---|---|---|---|
| 3,614,756 | A | * | 10/1971 | McIntosh | G05D 3/20 360/112 |
| 3,956,769 | A | * | 5/1976 | Beecroft | G11B 5/265 360/131 |
| 4,318,141 | A | * | 3/1982 | Haynes | G11B 5/02 360/131 |
| 4,390,911 | A | * | 6/1983 | Klaassen | G11B 5/58 360/18 |
| 5,583,727 | A | * | 12/1996 | Parkin | G11B 35/012 360/135 |

(Continued)

OTHER PUBLICATIONS

International Search Report and Written Opinion of the ISA for PCT/SG2014/000436, ISA/AU, Woden ACT, dated Nov. 13, 2014.

*Primary Examiner* — Kevin M Bernatz

(57) ABSTRACT

In various embodiments, a magnetic medium may be provided. The magnetic medium may include a substrate. The substrate may include a servo layer over the substrate. The servo layer may include a cap layer having a first coercivity. The servo layer may also include a granular layer having a second coercivity greater than the first coercivity. The servo layer may also include an intervening layer between the cap layer and the granular layer.

13 Claims, 15 Drawing Sheets

(56) References Cited

U.S. PATENT DOCUMENTS

| | | | | |
|---|---|---|---|---|
| 6,468,670 B1* | 10/2002 | Ikeda | ............... | G11B 5/66 |
| | | | | 428/611 |
| 6,873,482 B1* | 3/2005 | Hsieh | ............... | G11B 5/5956 |
| | | | | 360/48 |
| 2003/0054204 A1* | 3/2003 | Kasuga | ............... | G11B 5/716 |
| | | | | 428/845.6 |
| 2003/0138671 A1* | 7/2003 | Oikawa | ............... | G11B 5/65 |
| | | | | 428/828 |
| 2004/0051994 A1* | 3/2004 | Akiyama | ........... | G11B 5/59633 |
| | | | | 360/77.07 |
| 2005/0146992 A1* | 7/2005 | Inomata | ........... | G11B 11/10589 |
| | | | | 369/13.02 |
| 2007/0070547 A1 | 3/2007 | Kamata et al. | | |
| 2010/0159284 A1* | 6/2010 | Choe | ............... | G11B 5/66 |
| | | | | 428/831 |
| 2012/0044597 A1* | 2/2012 | Yoshida | ............... | G11B 5/66 |
| | | | | 360/110 |
| 2012/0263975 A1* | 10/2012 | Oikawa | ............... | G11B 5/65 |
| | | | | 428/846.7 |
| 2013/0128377 A1* | 5/2013 | Leong | ............... | G11B 321/02 |
| | | | | 360/55 |
| 2013/0314814 A1* | 11/2013 | Takahoshi | ............... | G11B 5/66 |
| | | | | 360/55 |
| 2014/0002917 A1* | 1/2014 | Takahoshi | ............... | G11B 5/738 |
| | | | | 360/39 |
| 2014/0002919 A1* | 1/2014 | Takahoshi | ............... | G11B 320/1217 |
| | | | | 360/48 |
| 2014/0030551 A1* | 1/2014 | Shi | ............... | G11B 5/667 |
| | | | | 428/800 |
| 2014/0133047 A1* | 5/2014 | Takahoshi | ............... | G11B 5/59633 |
| | | | | 360/48 |
| 2016/0232935 A1* | 8/2016 | Tsai | ............... | G11B 11/10578 |

\* cited by examiner

300a

302

300b

312

304

318

300c

300d

400a

402

400b

|  | Hc(KOe) | Hn(KOe) | Hs(KOe) | S* |
|---|---|---|---|---|
| Servo Layer | 5.6 | -3.4 | 9.9 | 0.61 |

500a

| Layer structure Granular/EBL/CAP | Hn (kOe) | Hs (kOe) | S* |
|---|---|---|---|
| 8nm /0.5nm/ 2nm | -3.5 | 9.3 | 0.61 |

| | Linear density loss (%) of DL-on-SL(capped) with respect to DL |
|---|---|
| BER-2 | 2.94 |
| BER-3 | 7.49 |

| | Linear density loss (%) of DL-on-SL(reverse capped) with respect to DL |
|---|---|
| BER-2 | 2.55 |
| BER-3 | 7.75 |

<u>700a</u>

| Thickness of granular layer | Hn | Hs | S* |
|---|---|---|---|
| 8 nm | -3.2 | 9.0 | 0.63 |
| 7 nm | -2.7 | 7.5 | 0.62 |
| 6 nm | -3.0 | 6.4 | 0.73 |

900 provide a substrate

902 form a servo layer over the substrate, the servo layer including a cap layer having a first coercivity; a granular layer having a second coercivity greater than the first coercivity value; and an intervening layer between the cap layer and the granular layer

904

US 10,020,015 B2

MAGNETIC MEDIUM HAVING MULTILAYERED SERVO LAYER AND METHOD OF FORMING THE SAME

CROSS-REFERENCE TO RELATED APPLICATION

This application is a 371 U.S. National Stage of International Application No. PCT/SG2014/000436, filed 16 Sep. 2014, which claims the benefit of priority of Singapore patent application No. 201307023-0, filed 17 Sep. 2013. The contents of both applications are hereby incorporated by reference in their entirety for all purposes.

TECHNICAL FIELD

Various aspects of this disclosure relate to magnetic media and methods of forming the same.

BACKGROUND

In current commercial perpendicular magnetic recording (PMR) media, both data signal and servo signal are stored in a same magnetic layer. Both data signal and servo signal are written by a same kind of magnetic writing head.

SUMMARY

In various embodiments, a magnetic medium may be provided. The magnetic medium may include a substrate. The substrate may include a servo layer over the substrate. The servo layer may include a cap layer having a first coercivity. The servo layer may also include a granular layer having a second coercivity greater than the first coercivity. The servo layer may also include an intervening layer between the cap layer and the granular layer.

In various embodiments, a method of forming a magnetic medium may be provided. The method may include providing a substrate. The method may further include forming a servo layer over the substrate. The servo layer may include a cap layer having a first coercivity. The servo layer may also include a granular layer having a second coercivity greater than the first coercivity value. The servo layer may additionally include an intervening layer between the cap layer and the granular layer.

BRIEF DESCRIPTION OF THE DRAWINGS

The invention will be better understood with reference to the detailed description when considered in conjunction with the non-limiting examples and the accompanying drawings, in which:

FIG. 5C is a table illustrating the linear density loss (%) of data layer on capped servo layer with respect to data layer according to various embodiments.

FIG. 6C is a table illustrating the linear density loss (%) of data layer on reverse capped servo layer with respect to data layer according to various embodiments.

FIG. 9 is a schematic illustrating a method of forming a magnetic medium according to various embodiments.

DETAILED DESCRIPTION

Figure 1A:
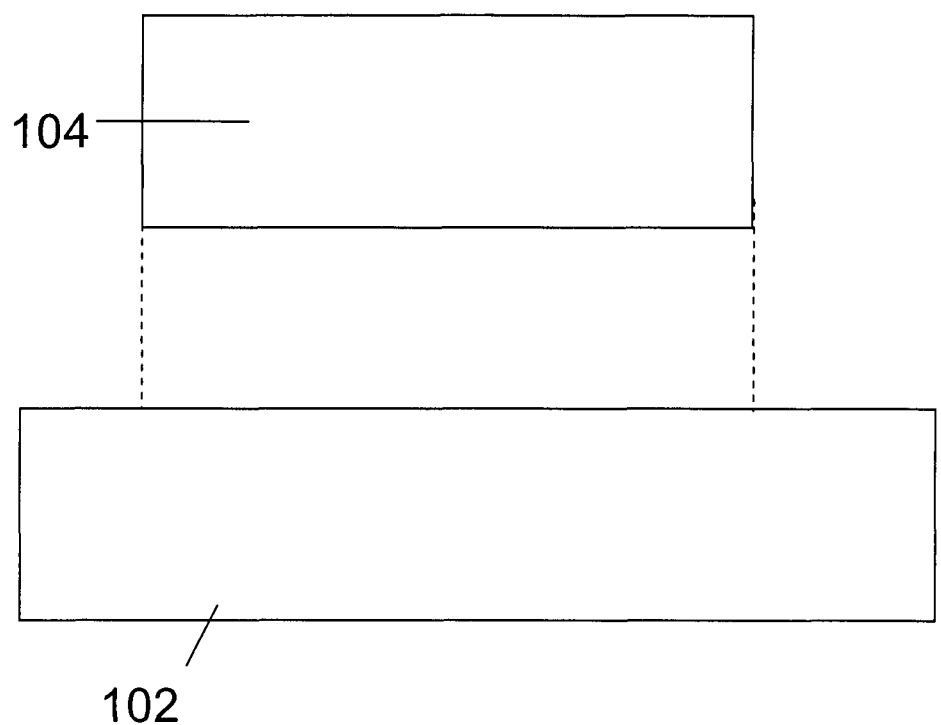
FIG. 1A is a schematic showing a cross-sectional side view of a magnetic medium according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

It should be understood that the terms "bottom", "top", "left", "right", "corner" etc., when used in the following description are used for convenience and to aid understanding of relative positions or directions, and not intended to limit the orientation of any device, structure, or medium or any part of any device, structure or medium.

In dedicated servo media, data signal and servo signal may be stored in separate magnetic layers. The data signal may be stored in a data layer, and the servo signal may be stored in a servo layer. The data layer may be over the servo layer with an intermediate layer, or IML(data), between the data layer and servo layer. Below the servo layer may be another intermediate layer, or IML(servo). Between IML (servo) and the substrate is soft underlayer. A carbon overcoat (COC) may be above the data layer, and a lubricant may be above COC.

The data signal may be written to the data layer by a magnetic writing head called production head (may also be referred to as a product head). The magnetic head may be commercially available. The width of current commercial production head may range from about 50 nm to about 100 nm. The servo signal may be written to the servo layer by a kind of wide head with a wider width, which is called wide head. The width of a wide head may range from about 300 nm to about 1500 nm. The wide head may have a higher writing capability than production head.

The reason why the wide head may be used to write servo signal into servo layer is because of the space loss of writing field generated by the writing head. It is well-known the magnetic field may be reduced as the distance between the point observed and the permanent magnet or a magnetic sensor, such as magnetic writing head, increases. Here the space loss may refer to the reduction in writing field due to the extra distance of the total thickness of data layer and IML(data).

In dedicated servo technology, servo signal may be written into servo layer by wide head at first. Servo signal may be written for one time only and may be desired to be kept in servo layer permanently. The servo layer may also have good write-ability so it may be written.

The data signal may be subsequently written into the data layer by the production head and may overwrite the servo signal written in the data layer by the wide head during above servo writing. However, the servo signal in the servo layer may not be overwritten by the data signal. The data signal may be written for multiple times. In order for the servo signals to be stored in the servo layer on a permanent basis, no servo signal written to the servo layer may be allowed to be overwritten by the production head. The servo layer may thus be required to have good anti-erasure capability.

The write-ability of the servo layer may depend on the width of wide head, the distance between the bottom surface of wide head and the top surface of servo layer, and maximum switching field of the magnetic grain, i.e. the saturation field ($H_s$) in the magnetization—magnetic field strength (M-H) hysteresis loop of servo layer. The lower the $H_s$, the better the write-ability of servo layer.

The anti-erasure capability of servo layer may depend on the width of production head, the minimum switching field of the magnetic grain, i.e. the nucleation field ($H_n$) in M-H hysteresis loop of servo layer. $H_n$ may be defined as the field where the magnetization is equal to 95% of saturation magnetization ($M_s$). The higher the $H_n$, the better the anti-erasure capability of servo layer.

The servo layer may be required to have a high $H_n$ and a low $H_s$. The M-H hysteresis loop may be more square-shaped, or less-sheared, with a high coercivity squareness S*, where S* follows the equation:

$$\frac{dM}{dH} = \frac{M_r}{(1-S^*)H_c} \quad (1)$$

PMR media may include CoCrPt:oxides. In a PMR medium, CoCrPt:oxides may be the basic materials with a small magnetic grain size (about 7 to about 9 nm). In dedicated servo media, the data layer may also include CoCrPt:oxides. The CoCrPt:oxides may have a small magnetic grain size (about 7 nm to about 9 nm) for high areal density. The servo layer may have the same track density as the data layer and may also include CoCrPt:oxides with a granular microstructure.

Compared to PMR media, dedicated servo media may include two more layers, i.e. servo layer and IML(servo), which may have a negative effect on the microstructure, magnetic properties and/or areal density of the data layer of dedicated servo media. The linear density loss may be defined as the difference in linear density of the data layer media and the data layer in dedicated servo media. The linear density loss should be as small as possible, preferably lower than 3% at a raw BER of $10^{-2}$ Dedicated servo technology is a quite new technology for hard disk drives (HDD). Various embodiments may have a layered structure and design of servo layer for dedicated servo media that simultaneously meets the abovementioned requirements.

FIG. 1A is a schematic 100a showing a cross-sectional side view of a magnetic medium according to various embodiments. The magnetic medium may include a substrate 102. The substrate 102 may include a servo layer 104 over the substrate 102. The servo layer 104 may include a cap layer having a first coercivity. The servo layer 104 may also include a granular layer having a second coercivity greater than the first coercivity. The servo layer 104 may also include an intervening layer between the cap layer and the granular layer.

In other words, the magnetic medium may include a substrate 102 and a servo layer 104 over the substrate 102. The dotted lines in FIG. 1A may represent one or more optional layers between the substrate 102 and the servo layer 104. The servo layer 104 may include a cap layer, a granular layer and an intervening layer separating the cap layer and the granular layer. The granular layer may have a coercivity having a value greater than that of the cap layer.

Various embodiments may have improved writability during servo writing. Various embodiments may have better anti-erasure capability during data writing. Various embodiments may have a lower linear density loss.

The magnetic medium may include a granular microstructure.

The intervening layer may be or may be referred to as an exchange break layer. The intervening layer may be configured to tune or adjust coupling strength between the granular layer and the cap layer.

In various embodiments, the intervening layer or the exchange break layer may be configured or used to reduce the saturation field ($H_s$) and/or increase the nucleation field ($H_n$) of the servo layer 104. The intervening layer or the exchange break layer may be configured or used to reduce the saturation field ($H_s$) and/or increase the nucleation field ($H_n$) of the servo layer 104 within a certain range by tuning the coupling strength between the granular layer and the cap layer regardless of the position of the layers (e.g. whether the granular layer is over the cap layer or whether the cap layer is over the granular layer).

Figure 1B:
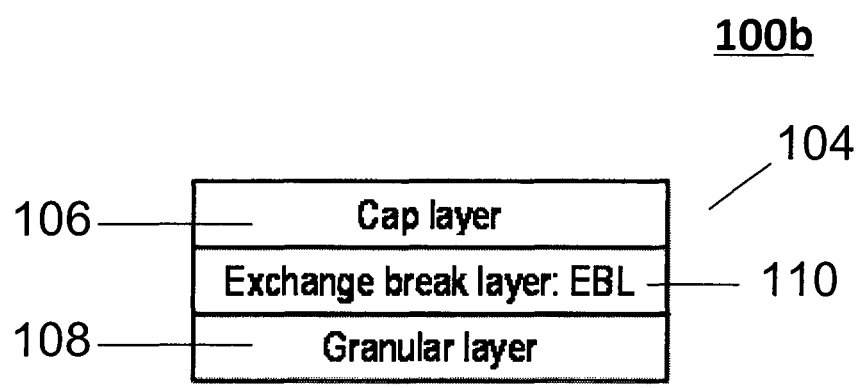
FIG. 1B is a schematic showing a cross-sectional side view of a servo layer 104 according to various embodiments.

FIG. 1B is a schematic 100b showing a cross-sectional side view of a servo layer 104 according to various embodiments. The servo layer 104 may include a cap layer 106, a granular layer 108 and an intervening layer 110 between the cap layer 106 and the granular layer 108. The intervening layer 110 may be over the granular layer 108 and the cap layer 106 may be over the intervening layer 110. The arrangement shown in FIG. 1B may be referred to as a capped servo layer.

Figure 1C:
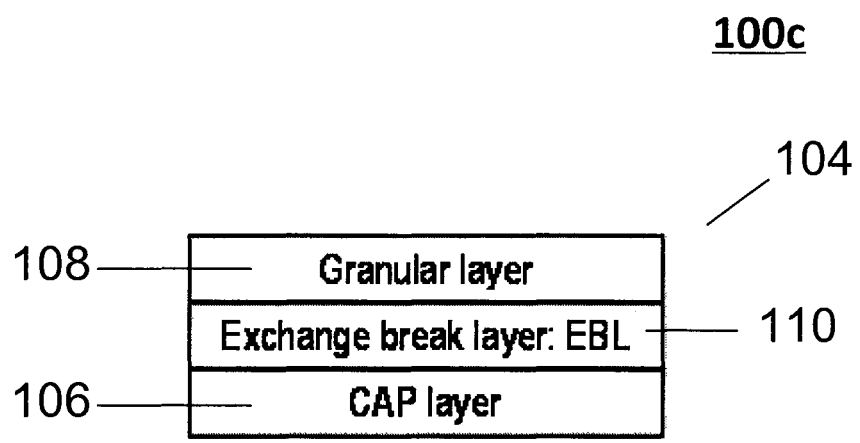
FIG. 1C is a schematic showing a cross-sectional side view of a servo layer 104 according to various other embodiments.

FIG. 1C is a schematic 100c showing a cross-sectional side view of a servo layer 104 according to various other embodiments. The intervening layer 110 may be over the cap layer 106 and the granular layer 108 may be over the intervening layer.

The cap layer 106 may be a magnetic layer. The cap layer 106 may include a magnetic material such as a magnetic alloy. The arrangement shown in FIG. 1C may be referred to as a reverse capped servo layer.

The cap layer 106 may include a magnetic alloy with a hexagonal close-packed (hcp) crystalline structure and perpendicular magnetic anisotropy to form a quasi-continuous layer. The cap layer 106 may also be referred to as a continuous layer.

For instance, the cap layer 106 may include an alloy comprising cobalt, chromium and platinum and one or more elements selected from a group consisting of boron, tantalum, ruthenium, nickel and iron. In other words, the granular layer may include CoCrPtX where X may be B, Ta, Ru, Ni, or Fe.

The granular layer 108 may be a magnetic layer. The granular layer 106 may include a magnetic material such as a magnetic alloy.

The granular layer 108 may include a magnetic alloy with a hexagonal close-packed (hcp) crystalline structure and perpendicular magnetic anisotropy to form a grain-isolated layer For instance, the granular layer 108 may include an alloy comprising cobalt, chromium and platinum, one or more elements selected from a group consisting of titanium, tantalum, ruthenium, nickel and iron and one or more oxides selected from a group consisting of titanium oxide, silicon oxide, tantalum oxide, boron oxide, cobalt oxide, aluminum oxide, chromium oxide and tungsten oxide. In other words, the granular layer may include CoCrPtX-oxides where X may be Ti, Ta, Ru, Ni, or Fe, and the oxide may include $TiO_2$, $SiO_2$, $Ta_2O_5$, $B_2O_3$, $CoO$, $ZrO_2$, $Al_2O_3$, $Cr_2O_3$, or $W_2O_5$.

The intervening layer 110 may be a non-magnetic layer or a weakly magnetic layer. The intervening layer 110 may include a non-magnetic or a weakly magnetic material (e.g. including paramagnetic or diamagnetic materials). The intervening layer 110 may include a weakly magnetic or nonmagnetic granular alloy layer with a hexagonal close packed (hcp) crystalline structure. The intervening layer 110 may be thin. The intervening layer 110 may be less than 2 nm, e.g. between about 0 nm to about 1.3 nm, e.g. between about 0.2 nm and about 1 nm.

The intervening layer 110 may include ruthenium (Ru), ruthenium—cobalt (RuCo), cobalt—chromium (CoCr), cobalt—ruthenium—chromium (Co—Ru—Cr) or alloys there of with and without an oxide. Suitable oxides may include oxides of silicon (Si), titanium (Ti) or tantalum (Ta). Depending on the choice of material, and more particularly on the concentration of cobalt in the intervening layer 110, the intervening layer 110 may have a thickness of less than about 2 nanometers, or between about 0 to about 1.3 nanometer or between about 0.2 nanometers and about 1 nanometer.

The interlayer exchange coupling between the granular layer 108 and the cap layer 106 may be optimized, in part, by adjusting the materials and thickness of the intervening layer 110. The intervening layer 110 may be configured to tune or adjust (interlayer) coupling strength between the granular layer 108 and the cap layer 106. The interlayer exchange coupling may not so weak that the granular layer and the intervening layer 110 behave as independent entities. Likewise, the interlayer exchange coupling may be not so strong that the magnetic behavior of the granular layer and the intervening layer 110 are rigidly bound together.

The interlayer exchange coupling may be adjusted such that the magnetization of the cap layer 106 reverses before that of the granular layer 108, while exerting enough torque onto the grains of the granular layer 108 to aid in the magnetic reversal of the granular layer 108. The cap layer 106 may be magnetically softer (lower coercivity) than the granular layer 108. Also, the cap layer 106 may be characterized by an intergranular exchange coupling that is greater than the intergranular exchange coupling of the granular layer 108.

In various embodiments, the servo layer 104 may have a saturation field magnitude lower than 9.5 kOe. In various embodiments, the servo layer 104 may have a saturation field magnitude lower than 8.0 kOe. The servo layer may have a nucleation field magnitude greater than 2.5 kOe.

The magnetic medium may include a data layer over the servo layer 104. The data layer may have a linear density loss lower than 3% at a raw bit error rate of $10^{-2}$. The data layer may have a linear density loss lower than 8% at a raw bit error rate of $10^{-3}$.

The magnetic medium may include a dedicated servo medium or a data layer (DL) on servo (SL) medium or a full layer (FL) medium.

Figure 2A:
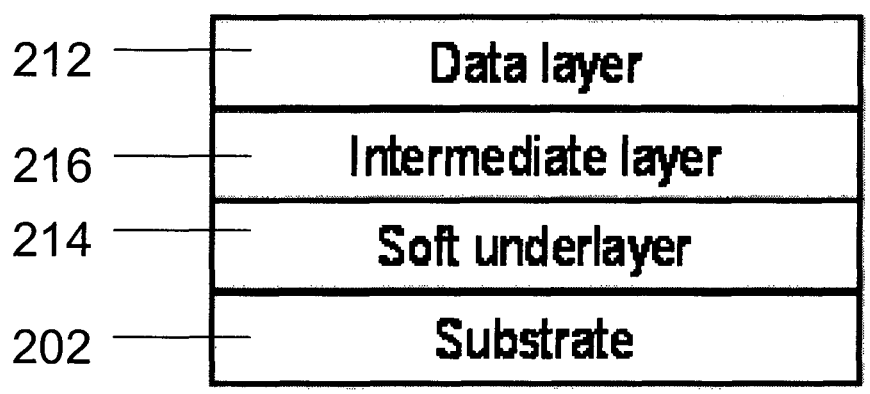
FIG. 2A is a schematic showing a cross-sectional side view of a data layer medium according to various embodiments.

FIG. 2A is a schematic 200a showing a cross-sectional side view of a data layer medium according to various embodiments. The magnetic medium may include a data layer (DL) medium. The data layer medium may include a data layer 212 over the substrate 202. The data layer medium may include a soft underlayer 214 on the substrate 202 and an intermediate layer 216 between the soft underlayer 214 and the data layer 212.

Figure 2B:
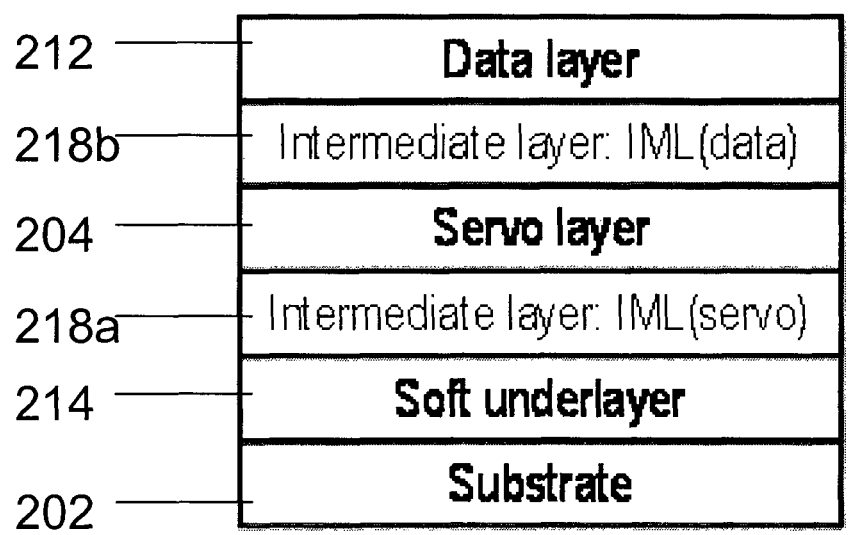
FIG. 2B is a schematic showing a cross-sectional side view of a dedicated servo medium according to various embodiments.

FIG. 2B is a schematic 200b showing a cross-sectional side view of a dedicated servo medium according to various embodiments. The dedicated servo medium may include a substrate 202 and a servo layer 204 over the substrate 202. The dedicated servo medium may include a data layer 212 over the servo layer 204. The dedicated servo medium may include a soft underlayer 214 on the substrate 202. The dedicated servo medium may include a first intermediate layer 218a between the substrate 202 and the servo layer 204. The first intermediate layer 218a may be between the soft underlayer 214 and the servo layer 204. The first intermediate layer 218a may be referred to as an intermediate layer (servo) or IML (servo). The dedicated servo medium may include a second intermediate layer 218b between the servo layer 204 and the data layer 212. The second intermediate layer may be referred to as an intermediate layer (data) or IML (data).

Figure 2C:
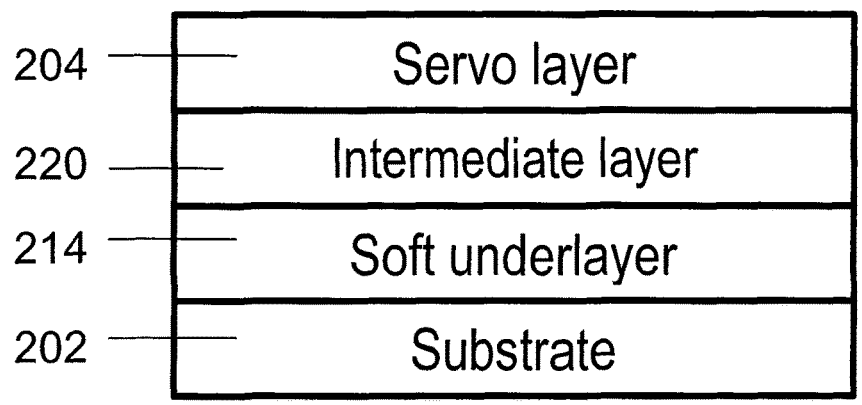
FIG. 2C is a schematic showing a cross-sectional side view of a servo layer medium according to various embodiments.

FIG. 2C is a schematic 200c showing a cross-sectional side view of a servo layer medium according to various embodiments. The magnetic medium may include a servo layer (SL) medium. The servo layer medium may include a substrate 202 and a servo layer 204 over the substrate 202.

The servo layer medium may include an intermediate layer 220 between the substrate 202 and the servo layer 204. The servo layer medium may include a soft underlayer 214 on the substrate 202. The intermediate layer 220 may be between the soft underlayer 214 and the servo layer 204.

The soft underlayer 214 may be amorphous. The soft underlayer 214 may include for instance, CoTaZr or CoFeZrB. The soft underlayer 214 may be a single layer or may include a plurality of sub-layers. For instance, the soft underlayer 214 may be an antiferromagnetic coupled structure including three layers: a first soft underlayer, an intermediate layer such as Ru on the first soft underlayer, and a second soft underlayer on the intermediate layer.

The magnetic medium may further include an adhesion layer between the soft underlayer 214 and the substrate 202. The adhesion layer may include one or more selected from a group consisting CrTi, Ta, NiTa.

The intermediate layers 216, 218a, 218b, 220 may include one or more selected from a group consisting Ru, NiW, NiWFe, NiWAl, NiWAlFe. The intermediate layers 216, 218a, 218b, 220 may have a hexagonal close-packed (hcp) [001] or face-center-cubic (fcc) [111] structure.

The data layer 212 may include a plurality of sub-layers. One of the plurality of sub-layers may include CoCrPt (Ru):oxides. Another of the plurality of sub-layers may include CoCrPt(B). The sub-layer including CoCrPt (Ru):oxides may be the topmost sub-layer and the sub-layer including CoCrPt(B) may be the bottom-most sub-layer.

The magnetic medium may further include a carbon over coat above the data layer 212 and/or the servo layer 204. The carbon over coat may act as a protective layer. The magnetic medium may also include a lubricant on the carbon over coat for flyability of the magnetic recording heads.

Figure 3A:
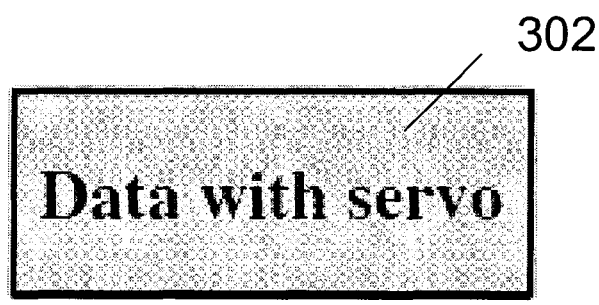
FIG. 3A is a schematic showing a conventional magnetic medium including a data layer.
Figure 3B:
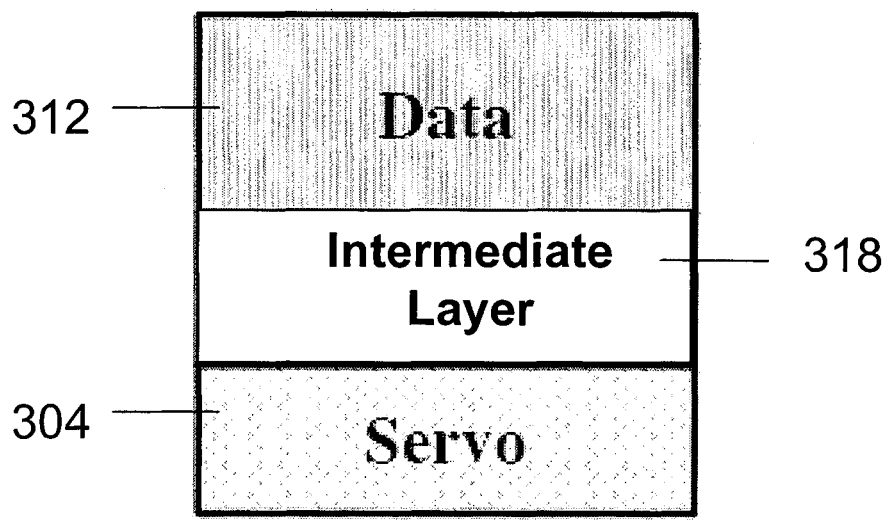
FIG. 3B is a schematic showing a cross-sectional side view of a dedicated servo medium according to various embodiments.

FIG. 3A is a schematic 300a showing a conventional magnetic medium including a data layer 302. Servo data is interspersed with user data in the data layer 302. The servo data may be stored in wedges within the data layer 302. FIG. 3B is a schematic 300b showing a cross-sectional side view of a dedicated servo medium according to various embodiments. The dedicated servo medium may include a servo layer 304, a data layer 312 and an intermediate layer 318 between the servo layer 304 and the data layer 312. The servo layer 304, the data layer 312 and the intermediate layer 318 may be on or over a substrate such as that shown in FIG. 2B. The dedicated servo layer may include additional layers between the servo layer 304 and the substrate and/or additional layers between the servo layer 304 and the data layer 312. The intermediate layer 318 may be referred to as an intermediate layer (data) or IML (data) as shown in FIG. 2B.

The dedicated servo medium may reduce or remove servo area from the data layer, which may save space for data storage within the data layer. Further, the dedicated servo medium may enhance head tracking capability and increase track density by continuous position signal (PES).

Figure 3C:
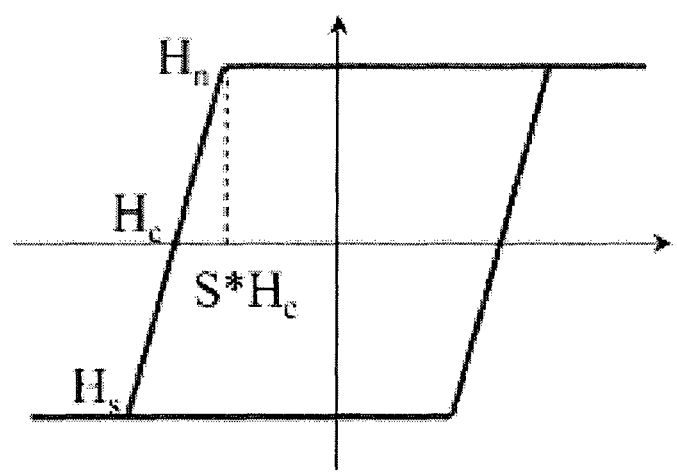
FIG. 3C is a graph showing a hysteresis curve of a magnetic medium according to various embodiments.

FIG. 3C is a graph 300c showing a hysteresis curve of a magnetic medium according to various embodiments. The magnetization (M) is plotted as a function of applied magnetic field strength (H). $H_s$ is the saturation field and $H_n$ is the nucleation field. $H_c$ represents the coercivity of the magnetic medium.

The servo layer 304 may be required to have a high coercivity squareness (S*) value. The nucleation field ($H_n$) may be related to coercivity ($H_c$) and coercivity squareness (S*).

$$H_n = S^* \times H_c \qquad (2)$$

For good write-ability, the saturation field magnitude may be required to be less than about 8.0 kOe for a widehead having a width of about 300 nm. The saturation field magnitude may be required to be less than about 11.0 kOe for a widehead having a width of about 1500 nm. On the other hand, for good anti-erasure capability, the nucleation field magnitude may be required to be greater than 4.0 kOe for a M7 head (of about 100 nm). The nucleation field magnitude may be required to be greater than 2.8 kOe for a D1 head (of about 60 nm)

Figure 3D:
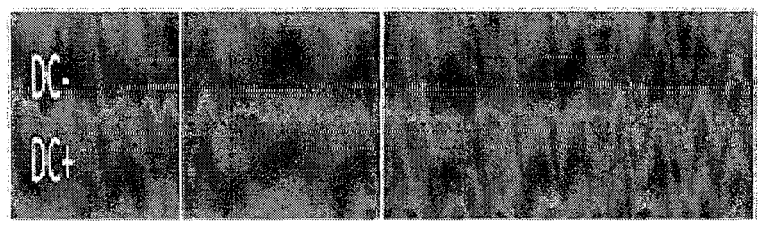
FIG. 3D is an image showing the granular microstructure of a magnetic medium.

FIG. 3D is an image 300d showing the granular microstructure of a magnetic medium. FIG. 3D shows the pinning sites for direct current (DC)+/direct current (DC)− transition. The pinning sites may have an effect on the saturation field and the nucleation field. The pinning sites may have a less negative effect on the data layer recording performance.

Figures 4A, 4B:
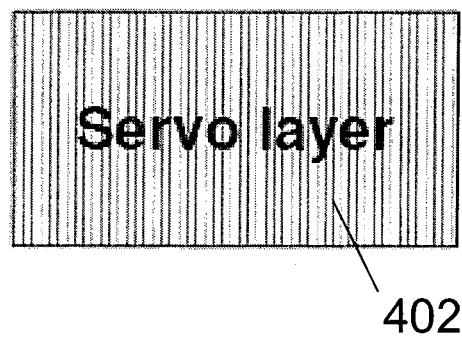
FIG. 4A is a schematic showing a cross-sectional side view of a conventional servo layer.
FIG. 4B is a table illustrating the various properties of the servo layer shown in FIG. 4A.

FIG. 4A is a schematic 400a showing a cross-sectional side view of a conventional servo layer 402. FIG. 4B is a table 400b illustrating the various properties of the servo layer 402 shown in FIG. 4A. The conventional servo layer 402 may be or may consist of a single layer of $Co_{55}Cr_8Pt_{19}$: 5.5($SiO_2$)-2.5($TiO_2$)-10(CoO). The servo layer 402 may have a S* value of about 0.60, $H_s > 9.0$ kOe and $H_n < 3.0$ kOe. The linear density loss caused by addition of the servo layer may be more than 15% at a raw bit data rate (BER) of about $10^{-3}$ to about $10^{-2}$.

In order to reduce the linear density loss caused by additional of servo layer, the S* value of the servo layer may be increased with a granular structure. The write-ability for the wide head and anti-erasure capability for production writing head may also be improved.

Figures 5A, 5B:
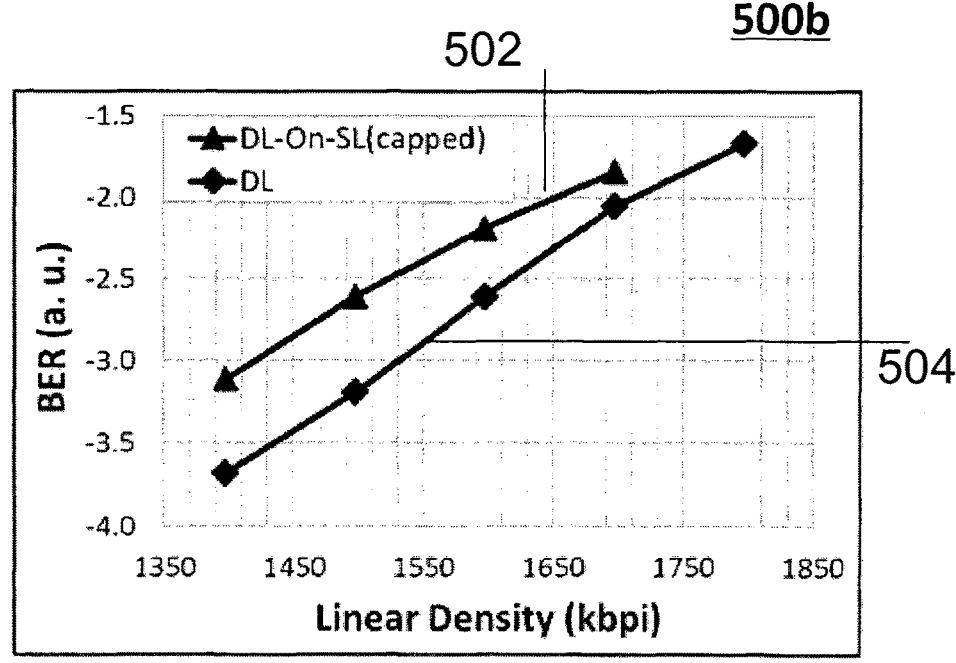
FIG. 5A is a table showing the various properties of the capped servo layer illustrated in FIG. 1B according to various embodiments.
FIG. 5B is a graph of bit error rate (in arbitrary units) against linear density (kbpi) illustrating the bit error rate (BER) performances of the capped servo layer and a data layer.

FIG. 5A is a table 500a showing the various properties of the capped servo layer illustrated in FIG. 1B according to various embodiments. The capped servo layer may include an intervening layer over a granular layer and a cap layer over the intervening layer. The granular layer may be about 8 nm, the intervening layer may be about 0.5 nm and the cap layer may be about 2 nm. The capped servo layer may have a S* value greater than 0.60, e.g. about 0.61. The capped servo layer may have a nucleation field of about −3.5 kOe. In other words, the capped servo layer may have a nucleation field magnitude of about 3.5 kOe. The capped servo layer illustrated in FIG. 5A may have anti-erasure capability for production head D1 head having a width of 60 nm (but not for M7 head of about 100 nm). The capped servo layer may have a saturation field of about 9.3 kOe. In other words, the capped servo layer may have a saturation field magnitude of about 9.3 kOe. The capped servo layer illustrated in FIG. 5A may thus be writable by a wide head having a width of 1500 nm but not by a wide head having a width of 300 nm.

Compared with a current commercial PMR medium with a nucleation field magnitude of about 2.0 kOe, a saturation field magnitude of about 8.5 kOe and S* value of about 0.45, the capped servo layer has a higher nucleation field magnitude, a higher saturation field magnitude and a higher S* value.

FIG. 5B is a graph 500b of bit error rate (in arbitrary units) against linear density (kbpi) illustrating the bit error rate (BER) performances of the capped servo layer and a data layer. 502 shows the performance of a data on the servo layer of the capped servo layer while 504 indicates the performance of a data layer medium. FIG. 5B shows that the BER of a data layer does not increase by too much due to the introduction of the capped servo layer.

FIG. 5C is a table 500c illustrating the linear density loss (%) of data layer on capped servo layer with respect to data layer according to various embodiments. The losses are 2.49% and 7.94% at raw bit error rate (BER) of $10^{-2}$ (denoted as −2) and $10^{-3}$ (denoted as −3) respectively. The low linear density may be acceptable in dedicated servo technology, making dedicated servo technology a potentially practical one.

Figures 6A, 6B:
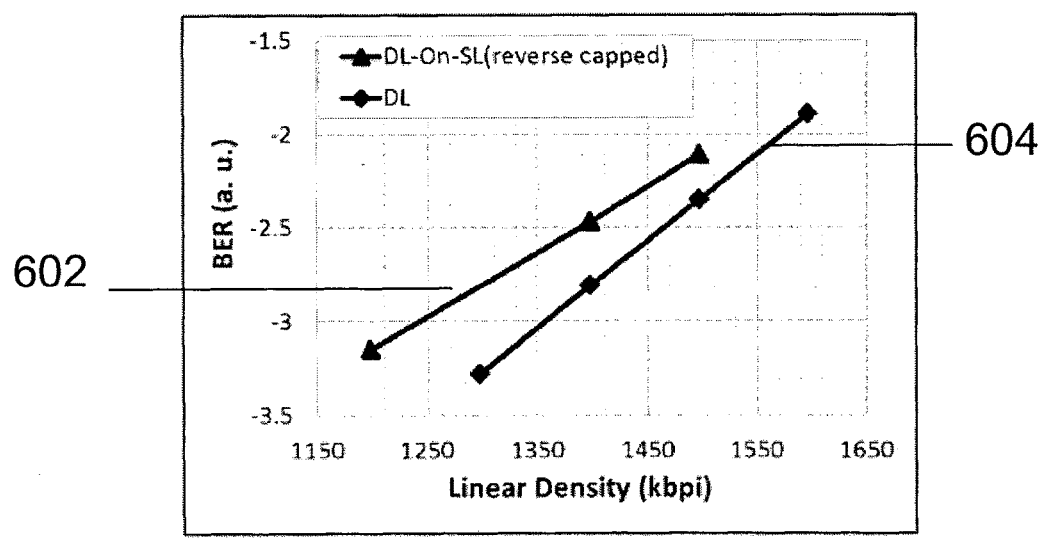
FIG. 6A is a table showing the various properties of the reverse capped servo layer illustrated in FIG. 1C according to various embodiments.
FIG. 6B is a graph of bit error rate (in arbitrary units) against linear density (kbpi) illustrating the bit error rate (BER) performances of the reverse capped servo layer and a data layer.

FIG. 6A is a table 600a showing the various properties of the reverse capped servo layer illustrated in FIG. 1C according to various embodiments. The reverse capped servo layer may include an intervening layer over a cap layer and a granular layer over the intervening layer. The granular layer may be about 7 nm, the intervening layer may be about 0.5 nm and the cap layer may be about 2 nm. The reverse capped servo layer may have a S* value greater than 0.60, e.g. about 0.62. The reverse capped servo layer may have a nucleation field of about −2.7 kOe. In other words, the reverse capped servo layer may have a nucleation field magnitude of about 2.7 kOe. The reverse capped servo layer illustrated in FIG. 6A may have anti-erasure capability for production head D1 head having a width of 60 nm (but not for M7 head having a width of about 100 nm). The reverse capped servo layer may have a saturation field of about 7.5. In other words, the reverse capped servo layer may have a saturation field magnitude of about 7.5. The reverse capped servo layer illustrated in FIG. 6A may thus be writable by a wide head having a width of 300 nm. The reverse capped servo layer illustrated in FIG. 6A may also be writable by a wide head having a with of 1500 nm.

FIG. 6B is a graph 600b of bit error rate (in arbitrary units) against linear density (kbpi) illustrating the bit error rate (BER) performances of the reverse capped servo layer and a data layer. 602 shows the performance of a data layer on the servo layer of the reverse capped servo layer while 604 indicates the performance of a data layer medium. FIG. 6B shows that the BER of a data layer does not increase by too much due to the introduction of the reverse capped servo layer.

FIG. 6C is a table 600c illustrating the linear density loss (%) of data layer on reverse capped servo layer with respect to data layer according to various embodiments. The losses are 2.55% and 7.75% at raw bit error rate (BER) of $10^{-2}$ (denoted as −2) and $10^{-3}$ (denoted as −3) respectively. The low linear density may be acceptable in dedicated servo technology, making dedicated servo technology a potentially practical one.

Figures 7A, 7B:
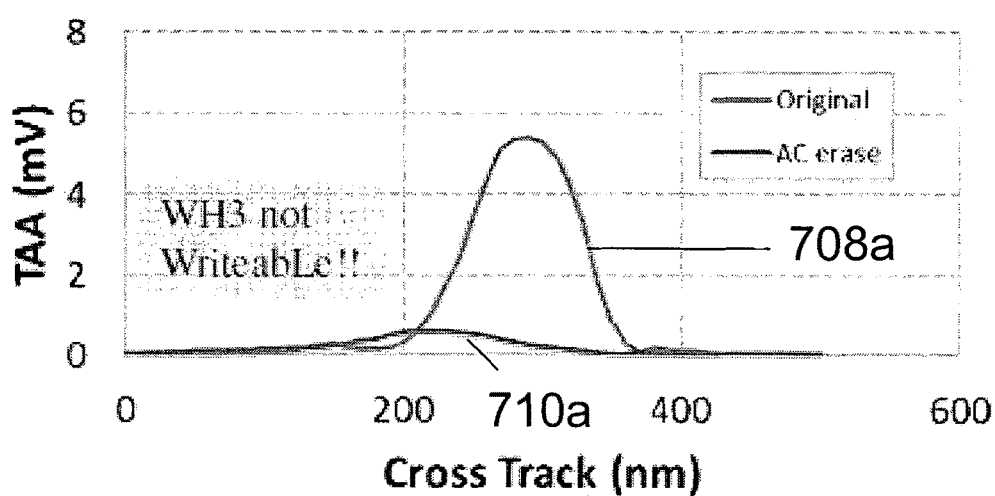
FIG. 7A is a table illustrating the various properties as a function of the thickness of the granular layer in a reverse capped servo layer of a full layer medium according to various embodiments.
FIG. 7B is a graph of track average amplitude (TAA) in millivolts (mV) against the cross track distance (nm) for a granular layer thickness of 8 nm.

FIG. 7A is a table 700a illustrating the various properties as a function of the thickness of the granular layer in a reverse capped servo layer of a full layer medium according to various embodiments. Column 702 indicates the variation of nucleation field ($H_e$) as a function of thickness, column 704 indicates the variation of saturation field ($H_s$) as a function of thickness, and column 706 indicates the variation of coercivity squareness (S*) as a function of thickness.

Table 700a shows that it is difficult to write to a servo layer having a granular layer of thickness 8 nm as the saturation filed is 9.0 above kOe. As highlighted above, for good write-ability, the saturation field magnitude may be required to be less than about 8.0 kOe for a widehead having a width of about 300 nm.

Figure 7C:
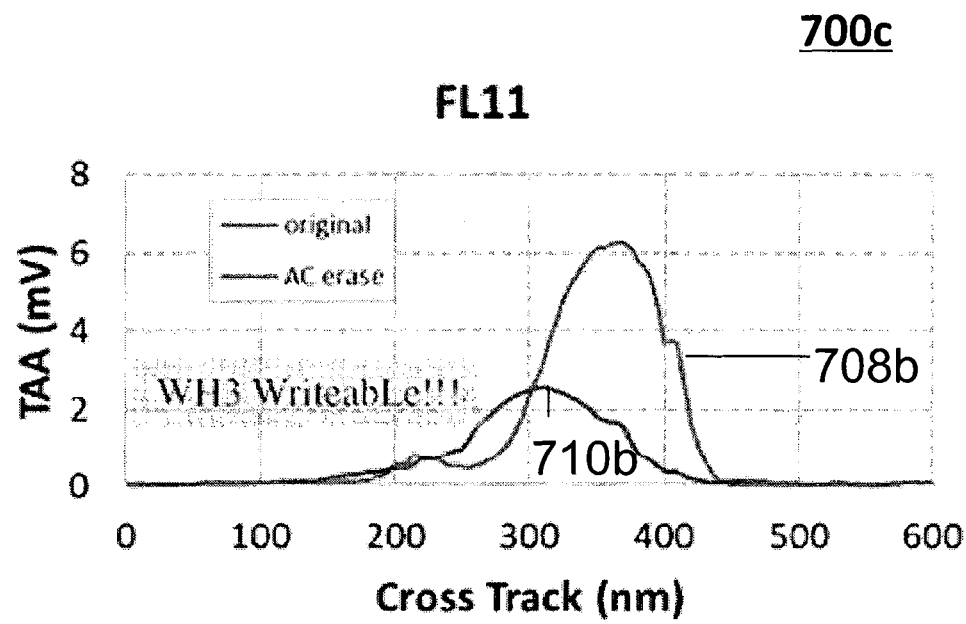
FIG. 7C is a graph of track average amplitude (TAA) in millivolts (mV) against the cross track distance (nm) for a granular layer thickness of 7 nm.
Figure 7D:
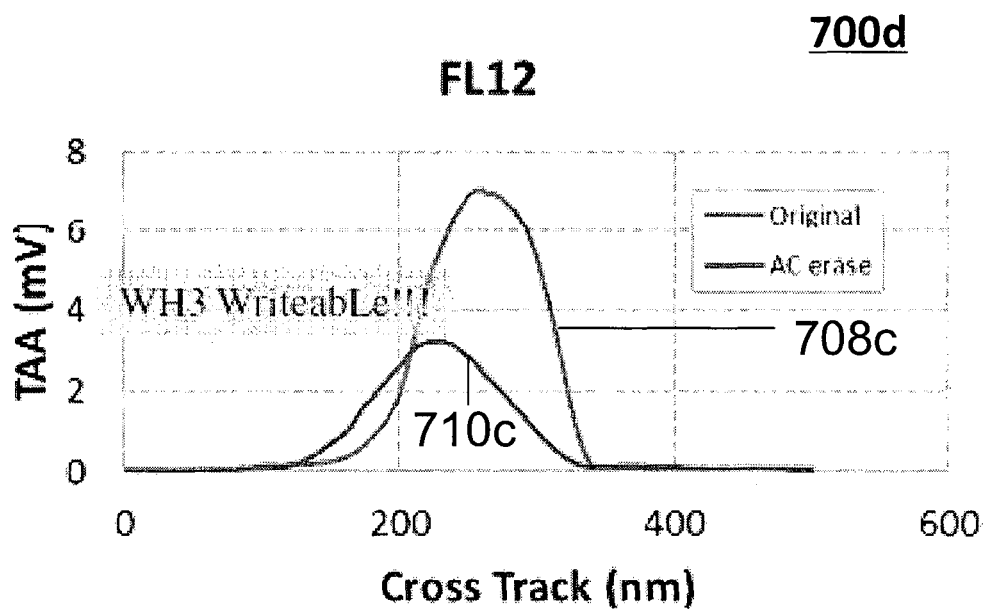
FIG. 7D is a graph of track average amplitude (TAA) in millivolts (mV) against the cross track distance (nm) for a granular layer thickness of 6 nm.

FIG. 7B is a graph 700b of track average amplitude (TAA) in millivolts (mV) against the cross track distance (nm) for a granular layer thickness of 8 nm. FIG. 7C is a graph 700c of track average amplitude (TAA) in millivolts (mV) against the cross track distance (nm) for a granular layer thickness of 7 nm. FIG. 7D is a graph 700d of track average amplitude (TAA) in millivolts (mV) against the cross track distance (nm) for a granular layer thickness of 6 nm. 708a, 708b, 708c represent the original profiles and 710a, 710b, 710c represent the profiles after an alternating current (AC) erase.

In various embodiments, a method of testing the magnetic medium may be provided. The method may include servo writing, e.g. by using the wide head. The method may include data writing, e.g. by using the production head. The production head may also be referred to as the product head. The method may include data reading, e.g, by using the production head. Servo writing may include writing servo data to a servo layer. Data writing may include writing user data to a data layer. Data reading may include reading user data from a data layer. The magnetic medium may be a full layer (FL) medium including a data layer over a servo layer. The servo layer may be a capped servo layer or a reverse capped servo layer. The magnetic medium may also be a data layer (DL) medium or a servo layer (SL) medium.

In various embodiments, post-process methods such as direct current (DC) erase may be carried out after forming the magnetic medium and before testing the magnetic medium.

Figure 8:
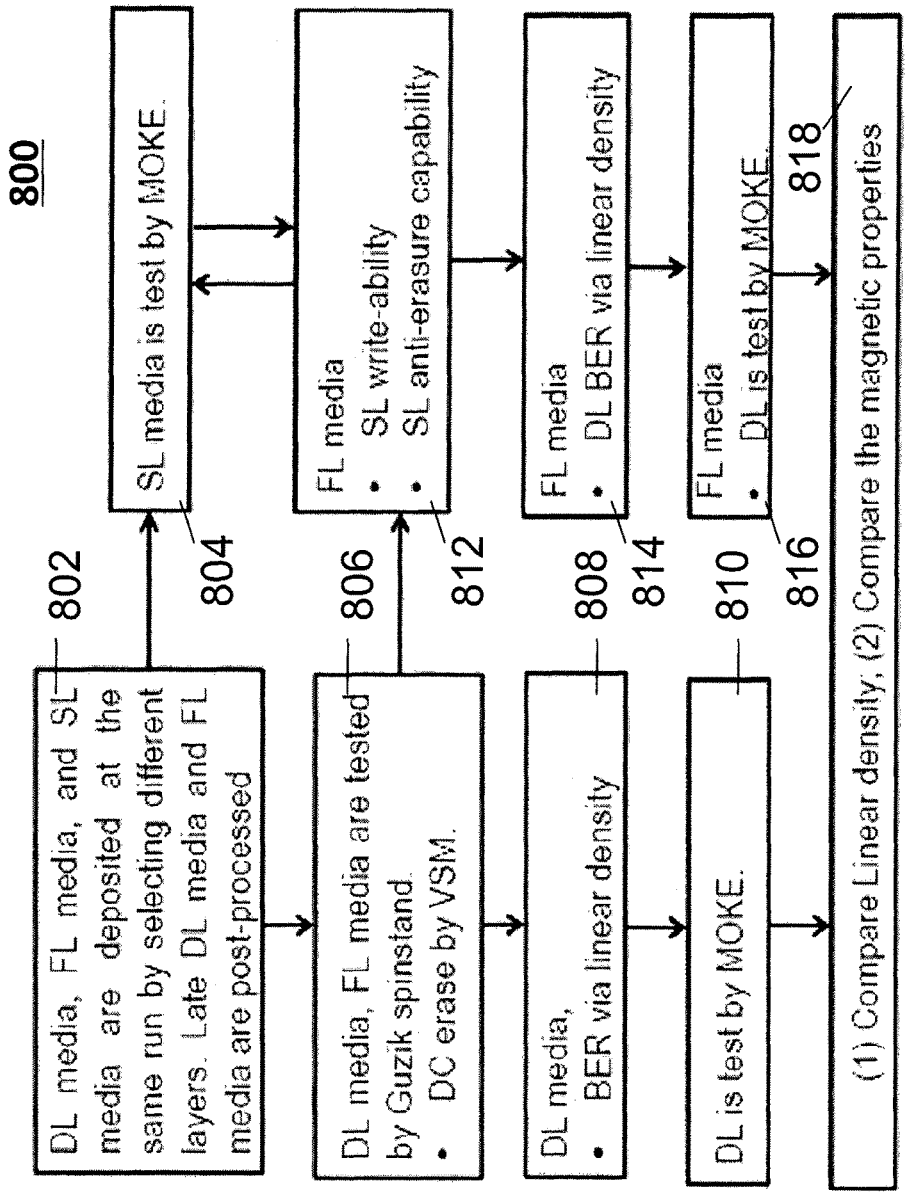
FIG. 8 is a schematic illustrating an experimental process for testing according to various embodiments.

FIG. 8 is a schematic 800 illustrating an experimental process for testing according to various embodiments. At 802, the data layer (DL) medium, the full layer (FL) medium, and the servo layer (SL) medium may be deposited at the same run by selecting different layers. The late DL medium and FL medium may be post-processed. The SL medium may be tested by magneto-optic kerr (MOKE) in 804. The DL medium and the FL medium may be tested by Guzik spinstand in 806. A direct current (DC) erase may be carried out by a vibrating sample magnetometer (VSM). For the DL medium, the bit error rate may be obtained via linear density in 808. The data layer (DL) in the FL medium may also be tested by MOKE in 810. The servo layer (SL) in the FL medium may be tested for write-ability and anti-erasure capability in 812. The data layer (DL) BER in the FL medium may also be determined by linear density on 814. The DL in the FL medium may be tested by MOKE in 816. The linear densities and magnetic properties of the DL medium, the SL medium and the FL medium may be compared in 818.

It has been shown that in various embodiments, the linear density loss caused by addition of servo layer in the full medium has decreased. Also, write-ability for the servo layer in the full medium has improved.

FIG. 9 is a schematic 900 illustrating a method of forming a magnetic medium according to various embodiments. The method may include, in 902, providing a substrate. The method may further include, in 904, forming a servo layer over the substrate. The servo layer may include a cap layer having a first coercivity. The servo layer may also include a granular layer having a second coercivity greater than the first coercivity value. The servo layer may additionally include an intervening layer between the cap layer and the granular layer.

In other words, the method may include forming a servo layer including a cap layer, a granular layer and an intervening layer over a substrate. The intervening layer may be arranged so that it is between the cap layer and the granular layer. The granular layer may have a coercivity having a value greater than that of the cap layer.

Forming the servo layer over the substrate may include depositing a suitable material using a suitable method to form the servo layer. Suitable methods may include one or more of methods such as chemical vapour deposition, sputtering etc. Forming a layer described herein may also include depositing a layer using a suitable method.

In various embodiments, forming the servo layer may include forming the intervening layer over the granular layer and forming the cap layer over the intervening layer. In various other embodiments, forming the servo layer may include forming the intervening layer over the cap layer and forming the granular layer over the intervening layer.

In other words, the cap layer may be the top layer and the granular layer may be the bottom layer in some embodiments. In other embodiments, the granular layer may be the top layer and the cap layer may the bottom layer.

In various embodiments, the method may include forming a data layer over the servo layer. The method may also include forming one or more intermediate layers between the servo layer and the data layer.

The method may include forming a soft underlayer (SUL) over or on the substrate. The method may also include forming an intermediate layer (IL) (servo layer or SL) over or on the soft underlayer (SUL). The method may additionally include forming the servo layer (SL) over or on the IL (SL). The method may further include forming the intermediate layer (IL) (data layer or DL) over or on the servo layer. The method may include forming the data layer (DL) over or on the IL (DL). The method may also include forming a diamond-like carbon (DLC) layer on or over the data layer.

The cap layer may include an alloy comprising cobalt, chromium and platinum and one or more elements selected from a group consisting of boron, tantalum, ruthenium, nickel and iron.

The granular layer may include an alloy comprising cobalt, chromium and platinum, one or more elements selected from a group consisting of titanium, tantalum, ruthenium, nickel and iron and one or more oxides selected from a group consisting of titanium oxide, silicon oxide, tantalum oxide, boron oxide, cobalt oxide, aluminum oxide, chromium oxide and tungsten oxide.

The intervening layer may be configured to adjust coupling strength between the granular layer and the cap layer. A suitable thickness of the intervening layer may be formed to adjust the coupling strength.

The servo layer may have a saturation field magnitude lower than 9.5 kOe. The servo layer may have a saturation field magnitude lower than 8.0 kOe. The servo layer has a nucleation field magnitude greater than 2.5 kOe.

In various embodiments, suitable thicknesses of the granular layer, the cap layer and/or the intervening layer may be deposited to achieve various desired properties of the servo layer such as a desired saturation field magnitude and/or a desired nucleation field magnitude.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A magnetic medium comprising:
   a substrate; and
   a dedicated servo layer over the substrate, wherein the dedicated servo layer (i) stores servo data comprising a servo signal and (ii) does not store user data;
   wherein the dedicated servo layer comprises
      a magnetic cap layer having a first coercivity;
      a magnetic granular layer having a second coercivity greater than the first coercivity; and
      an exchange break layer between the magnetic cap layer and the magnetic granular layer, wherein the exchange break layer is configured to adjust coupling strength between the cap layer and the granular layer such that a magnetization of the cap layer reverses prior to a magnetization of the granular layer, and wherein the exchange break layer has a thickness less than 2 nm; and
   a data layer over the dedicated servo layer, wherein the data layer (i) stores user data comprising a data signal and (ii) does not store servo data,
   wherein the dedicated servo layer has a saturation field magnitude greater than 9.0 kOe, a nucleation field magnitude greater than 2.5 kOe, and a coercivity squareness of greater than 0.60.

2. The magnetic medium according to claim 1, wherein the exchange break layer is over the granular layer and the cap layer is over the exchange break layer.

3. The magnetic medium according to claim 1, wherein the exchange break layer is over the cap layer and the granular layer is over the exchange break layer.

4. The magnetic medium according to claim 1, wherein the cap layer comprises an alloy comprising cobalt, chromium and platinum and one or more elements selected from a group consisting of boron, tantalum, ruthenium, nickel and iron.

5. The magnetic medium according to claim 1, wherein the granular layer comprises an alloy comprising cobalt, chromium and platinum, one or more elements selected from a group consisting of titanium, tantalum, ruthenium, nickel and iron and one or more oxides selected from a group consisting of titanium oxide, silicon oxide, tantalum oxide, boron oxide, cobalt oxide, aluminum oxide, chromium oxide and tungsten oxide.

6. The magnetic medium according to claim 1, wherein the data layer has a linear density loss lower than 3% at a raw bit error rate of $10^{-2}$.

7. The magnetic medium according to claim 1, wherein the data layer has a linear density loss lower than 8% at a raw bit error rate of $10^{-3}$.

8. A method of forming a magnetic medium, the method comprising:
   providing a substrate;
   forming a dedicated servo layer over the substrate, wherein the dedicated servo layer (i) stores servo data comprising a servo signal and (ii) does not store user data;
   wherein the dedicated servo layer comprises
      a magnetic cap layer having a first coercivity;
      a magnetic granular layer having a second coercivity greater than the first coercivity; and
      an exchange break layer between the cap layer and the granular layer, wherein the exchange break layer is configured to adjust coupling strength between the cap layer and the granular layer such that a magnetization of the cap layer reverses prior to a magnetization of the granular layer, and wherein the exchange break layer has a thickness less than 2 nm; and
   forming a data layer over the dedicated servo layer, wherein the data layer (i) stores user data and (ii) does not store servo data,
   wherein the dedicated servo layer has a saturation field magnitude greater than 9.0 kOe, a nucleation field magnitude greater than 2.5 kOe, and a coercivity squareness of greater than 0.60.

9. The method according to claim 8,
wherein forming the dedicated servo layer comprises:
forming the exchange break layer over the granular layer and forming the cap layer over the exchange break layer.

10. The method according to claim 8,
wherein forming the dedicated servo layer comprises:
forming the exchange break layer over the cap layer and forming the granular layer over the exchange break layer.

11. The method according to claim 8,
wherein the cap layer comprises an alloy comprising cobalt, chromium and platinum and one or more elements selected from a group consisting of boron, tantalum, ruthenium, nickel and iron.

12. The method according to claim 8,
wherein the granular layer comprises an alloy comprising cobalt, chromium and platinum, one or more elements selected from a group consisting of titanium, tantalum, ruthenium, nickel and iron and one or more oxides selected from a group consisting of titanium oxide, silicon oxide, tantalum oxide, boron oxide, cobalt oxide, aluminum oxide, chromium oxide and tungsten oxide.

13. The method according to claim 8, the method further comprising:
forming one or more intermediate layers between the dedicated servo layer and the data layer.

\* \* \* \* \*